United States Patent
Singh

(10) Patent No.: US 12,314,657 B2
(45) Date of Patent: May 27, 2025

(54) TECHNIQUES FOR MODIFYING MARKINGS ON A DIGITIZED DOCUMENT

(71) Applicant: Citrix Systems, Inc., Fort Lauderdale, FL (US)

(72) Inventor: Manbinder Pal Singh, Coral Springs, FL (US)

(*) Notice: Subject to any disclaimer, the term of this patent is extended or adjusted under 35 U.S.C. 154(b) by 714 days.

(21) Appl. No.: 17/501,417

(22) Filed: Oct. 14, 2021

(65) Prior Publication Data

US 2023/0123071 A1  Apr. 20, 2023

(51) Int. Cl.
*G06F 40/174* (2020.01)
*G06F 3/04842* (2022.01)
*G06V 30/262* (2022.01)
*G06V 30/412* (2022.01)
*G06V 30/414* (2022.01)

(52) U.S. Cl.
CPC .......... *G06F 40/174* (2020.01); *G06V 30/262* (2022.01); *G06V 30/412* (2022.01); *G06V 30/414* (2022.01); *G06F 3/04842* (2013.01)

(58) Field of Classification Search
CPC . G06F 40/174; G06F 3/04842; G06V 30/412; G06V 30/414
See application file for complete search history.

(56) References Cited

U.S. PATENT DOCUMENTS

| 8,234,562 | B1* | 7/2012 | Evans | G06F 40/174 715/224 |
|---|---|---|---|---|
| 10,685,224 | B1* | 6/2020 | Kekatpure | G06V 10/273 |
| 2017/0228590 | A1* | 8/2017 | Schlachter | G06F 40/109 |
| 2021/0034858 | A1* | 2/2021 | Singh | G06N 20/00 |
| 2022/0012481 | A1* | 1/2022 | Kosaka | G06T 7/0002 |

OTHER PUBLICATIONS

Singh, Manbinder Pal; "Electronic Application Created From a Physical Paper Form," U.S. Appl. No. 17/666,744, filed Feb. 8, 2022.
Singh, Manbinder Pal; "Electronic Fillable Forms," U.S. Appl. No. 17/536,525, filed Nov. 29, 2021.
Dey, Sourish; "CNN Application-Detecting Car Exterior Damage(full implementable code);" Jun. 20, 2019; downloaded from medium.com on Aug. 25, 2021; 17 pages.

* cited by examiner

*Primary Examiner* — Asher D Kells

(57) ABSTRACT

Techniques performed by a computing device are provided. A method includes (a) locating, by the computing device, a portion of a digital image that depicts fields of a paper form, the fields including markings; (b) identifying, by the computing device, a marking within one of the fields of the paper form as being contrary to a set of rules; and (c) modifying, by the computing device, the digital image to remove the identified marking from the digital image, so that the portion of the digital image depicts the one field of the paper form as being unmarked. An apparatus and computer program product for performing a similar method are also provided.

20 Claims, 5 Drawing Sheets

TECHNIQUES FOR MODIFYING MARKINGS ON A DIGITIZED DOCUMENT

BACKGROUND

Paper documents may be digitized to be accessible on a computer. A scanner may be used to generate a high quality digital image of the paper document. A digital camera may also be used to generate a digital image of a paper document. Digitized documents may be transported quickly over a network and stored in bulk without using much physical space. Optical Character Recognition (OCR) may also be used on digitized documents in order to make the text therein searchable and modifiable.

SUMMARY

Unfortunately, conventional digitized documents suffer from deficiencies. In particular, content that was not generated by a computer, such as handwritten content, may not be easily modified or removed from a digitized document. For example, if a user makes a mistake when filling out a paper form with a pen or other permanent marker, the user typically must obtain a new copy of the form to fill out again from scratch. This can be time consuming, and, in some cases, impossible, if a clean copy of the form does not exist. Digitization is typically no help in such circumstances.

Therefore, it would be desirable to allow a user to make corrections on a digitized document with handwritten content (such as by correcting a filled-out form without obtaining another copy of the form). This result may be accomplished by having a computing device detect marked fields on a digitized form and using the computing device to remove mistaken marks from fields of the form.

In one embodiment, a method is provided. The method includes (a) locating, by a computing device, a portion of a digital image that depicts fields of a paper form, the fields including markings; (b) identifying, by the computing device, a marking within one of the fields of the paper form as being contrary to a set of rules; and (c) modifying, by the computing device, the digital image to remove the identified marking from the digital image, so that the portion of the digital image depicts the one field of the paper form as being unmarked. An apparatus and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for allowing a user to make corrections on a digitized document with handwritten content (such as by correcting a filled-out faun without obtaining another copy of the form). This result may be accomplished by having a computing device detect marked fields on a digitized form and using the computing device to remove mistaken marks from fields of the form.

Figure 1:
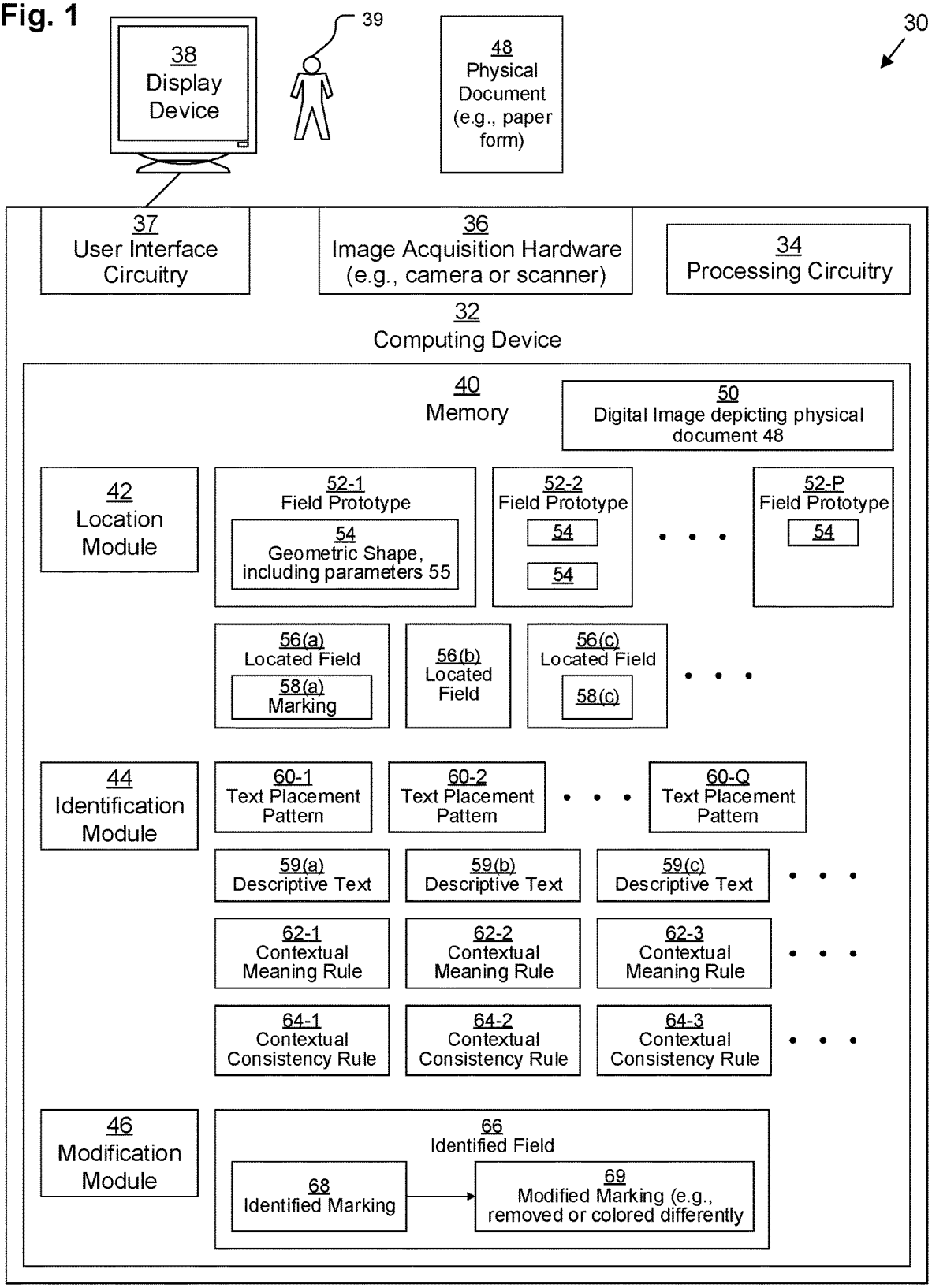
FIG. 1 is a block diagram depicting an example environment, apparatus, and data structure arrangement for use in connection with various embodiments.

FIG. 1 depicts an example environment 30 for use in connection with various embodiments. Environment 30 includes a computing device 32. Computing device 32 may be any kind of computing device, such as, for example, a personal computer, workstation, server computer, enterprise server, data storage array device, laptop computer, tablet computer, smart phone, mobile computer, etc.

Computing device 32 may include processing circuitry 34, image acquisition hardware 36, user interface circuitry 37, memory 40, and various additional elements (not depicted), such as, for example, interconnection circuitry.

Processing circuitry 34 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Image acquisition hardware (IAH) 36 serves to digitize images. In some embodiments, as depicted, IAH 36 may be embedded within computing device 36. In other embodiments (not depicted), IAH 36 may be external to computing device 32, connected to computing device 32 via a physical port (e.g., a serial port, a parallel port, a Universal Serial Bus port, a networking port, or any other physical port) or a wireless connection (e.g., Bluetooth, WiFi, etc.). IAH 36 may be used to digitize a physical document 48 (e.g., a paper form) into a digital image 50. In one embodiment, IAH 36 may include a camera configured to take a picture of the paper form 48. In another embodiment, IAH 36 may include a scanner or other image capture device configured to scan, record, or capture content of the paper form 48.

User interface circuitry 37 provides an interface to user input devices, such as a display device 38 and a user input device (not depicted), such as, for example, a keyboard, mouse, trackball, trackpad, touch-enabled screen, microphone, etc. for receiving input from a user 39. Display device 38 may be any kind of device for displaying images to user 39, such as, for example, a CRT screen, an LED screen, a plasma screen, an LCD screen, a printer, or any other display device.

In some embodiments, computing device 32 may also include storage interface circuitry (not depicted) to control and provides access to persistent storage (not depicted). Storage interface circuitry may include, for example, SCSI, SAS, ATA, SATA, FC, M.2, U.2, and/or other similar controllers and ports. Persistent storage may include non-transitory persistent storage drives, such as, for example, hard disk drives, solid-state storage devices (SSDs), flash drives, etc.

In some embodiments, computing device 32 may also include network interface circuitry (not depicted), such as, for example, one or more Ethernet cards, cellular modems, Fibre Channel (FC) adapters, InfiniB and adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc.

Memory 40 may include any kind of digital system memory, such as, for example, random access memory (RAM). Memory 40 stores an operating system (e.g., a Linux, UNIX, Windows, MacOS, or similar operating system) (not depicted) and various drivers (not depicted) in operation. Memory 40 also stores a location module 42, an identification module 44, a modification module 46, and other software modules (not depicted) any or all of which may execute on processing circuitry 34. Location module 42, identification module 44, and modification module 46 are pieces of software configured to cause computing device 32 to perform certain tasks (as described below in connection with FIGS. 2, 3, 6, and 7) when executed on processing circuitry 34.

Memory 40 also stores various other data structures used by the OS, modules 42, 44, 46, and various other applications and drivers. For example, memory 40 stores various sets of data (e.g., predetermined data), including field prototypes 52 (depicted as field prototypes 52-1, 52-2, . . . , 52-P) and text placement patterns 60 (depicted as text placement patterns 60-1, 60-2, . . . , 60-Q). Individual field prototype 56 may include one or more geometric shape descriptors 54, including parameters 55 describing that shape. As another example, memory 40 stores various sets of rules, such as contextual meaning rules 62 (depicted as contextual meaning rules 62-1, 62-2, 62-3, . . . ) and contextual consistency rules 64 (depicted as contextual consistency rules 64-1, 64-2, 64-3, . . . ). During operation, memory 40 may also store the digital image 50 depicting a physical or tangible document (e.g., a paper form) 48 as well as a set of located fields 56 (depicted as located fields 56(a), 56(b), 56(c), . . . ), a set of located descriptive text (depicted as located descriptive text 59(a), 59(b), 59(c), . . . ), and an identified field 66. Some of the located fields 56 may contain a marking 58 (depicted as marking 58(a) within located field 56(a) and marking 58(c) within located field 56(c)).

Memory 40 may also store various other data structures used by the OS, modules 42, 44, 46, and various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 is configured to store programs and data even while the computing device 32 is powered off. The OS, modules 42, 44, 46, and various other applications and drivers are typically stored in this persistent storage portion of memory 40 so that they may be loaded into a system portion of memory 40 upon a system restart or as needed. For example, field prototypes 52, text placement patterns 60, contextual meaning rules 62, and contextual consistency rules 64 are typically stored in persistent storage portion of memory 40. The OS, modules 42, 44, 46, and various other applications and drivers, when stored in non-transitory form either in the volatile portion of memory 40 or in persistent portion of memory 40, form respective computer program products. The processing circuitry 34 running one or more applications thus forms a specialized circuit constructed and arranged to carry out the various processes described herein.

Figure 2:
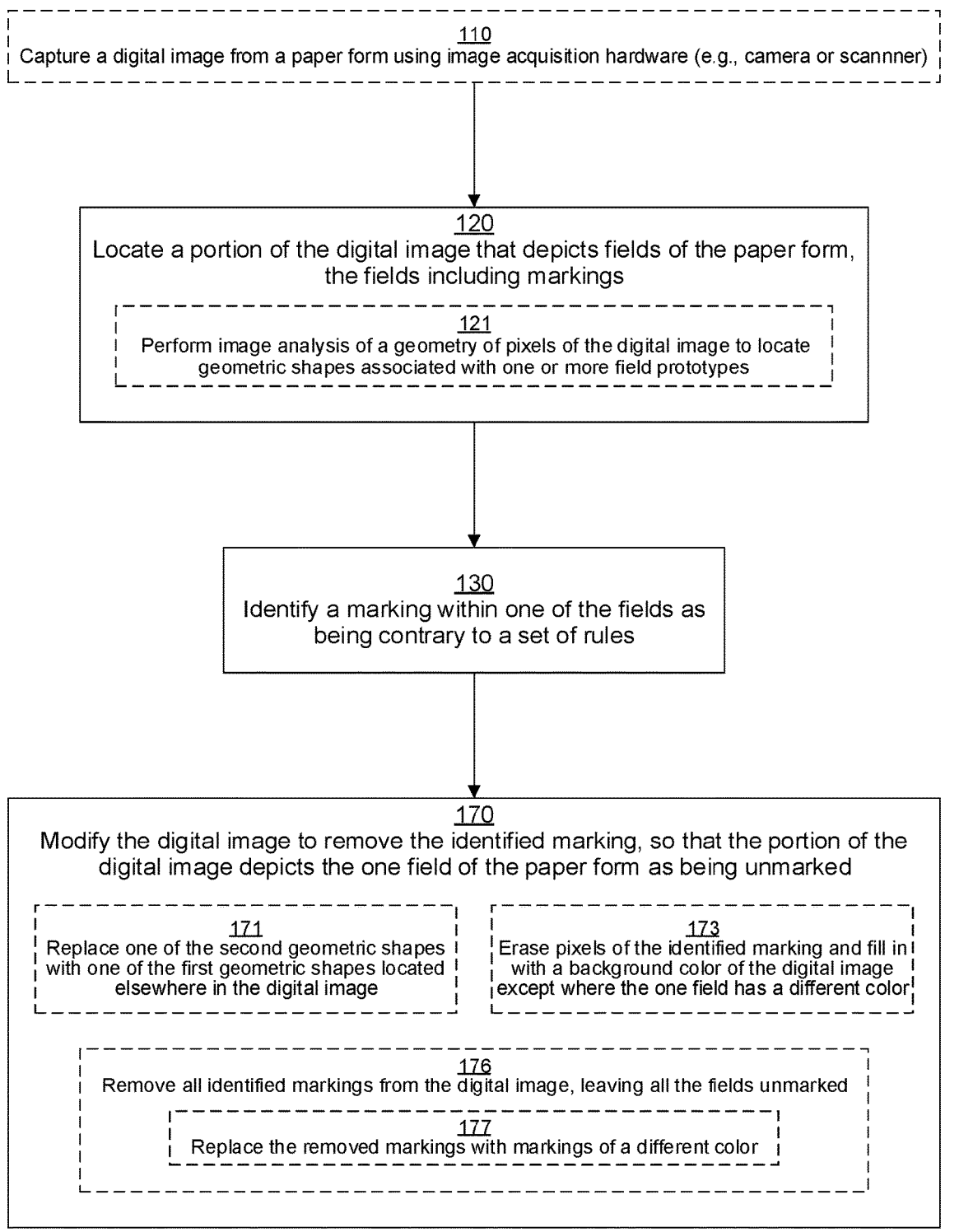
FIG. 2 is a flowchart depicting an example procedure according to various embodiments.

FIG. 2 illustrates an example method 100 performed by computing device 32. It should be understood that any time a piece of software (e.g., OS, modules 42, 44, 46, etc.) is described as performing a method, process, step, or function, what is meant is that a computing device (e.g., computing device 32) on which that piece of software is running performs the method, process, step, or function when executing that piece of software on its processing circuitry 34. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In optional step 110, computing device 32 captures a digital image 50 of a paper form 48 using IAH 36. In some embodiments, in lieu of step 110, digital image 50 may be received by computing device 32 from an external source, such as, for example, over a network or via a portable storage device (not depicted).

In step 120, computing device 32 (e.g., through execution of location module 42) locates a portion of the digital image 50 that depicts fields of the paper form 48, the fields including markings. In some embodiments, step 120 includes sub-step 121.

Figure 3:
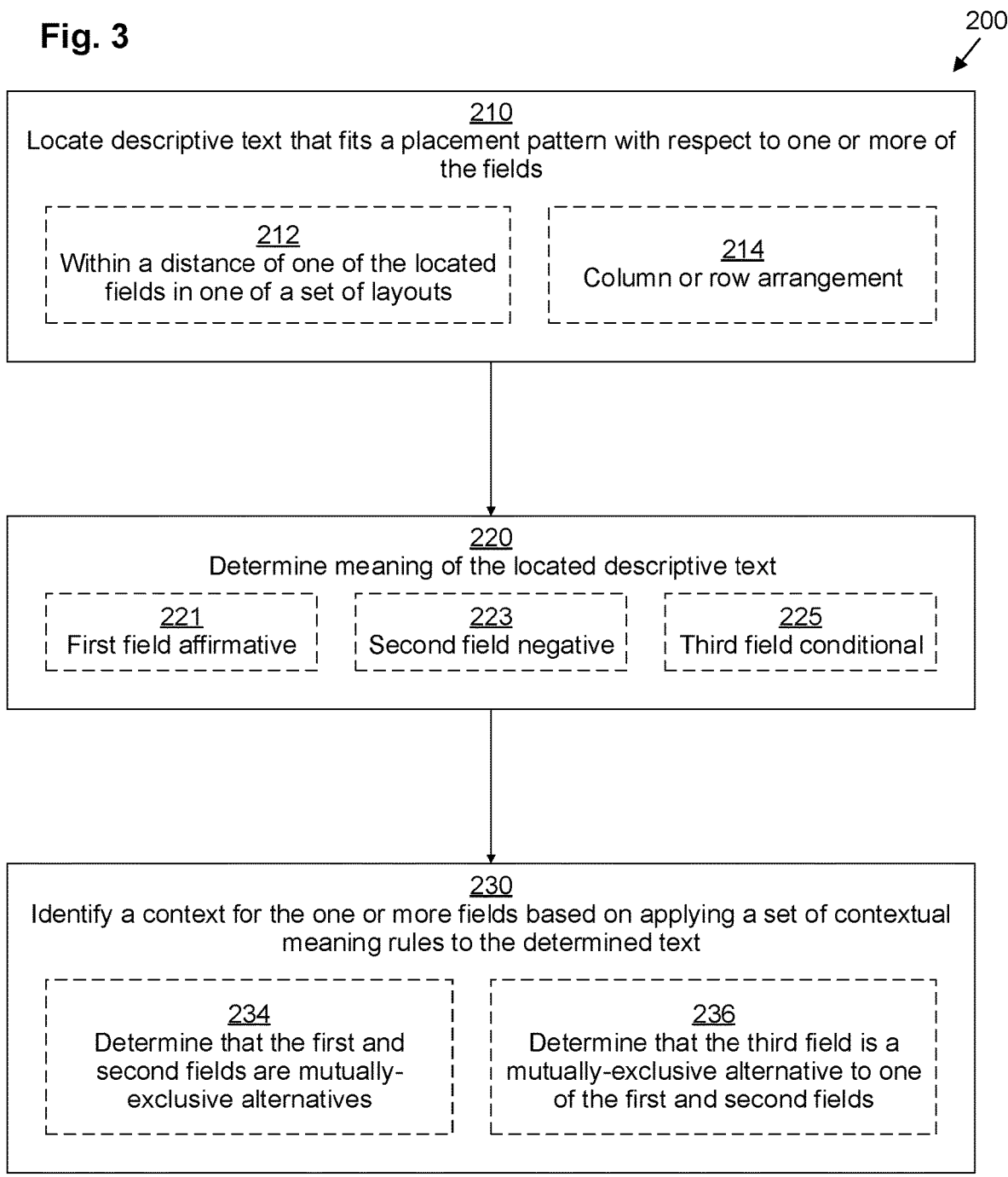
FIG. 3 is a flowchart depicting an example procedure according to various embodiments.
Figure 4:
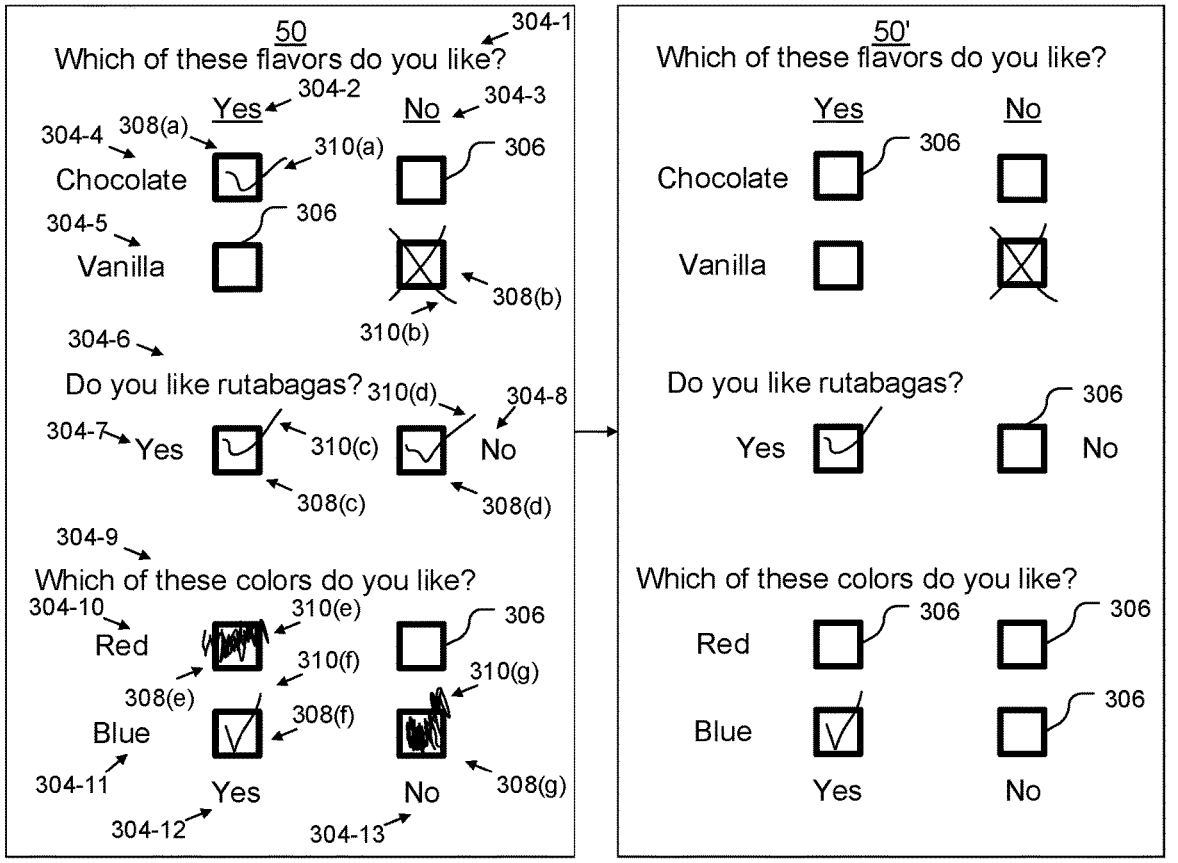
FIG. 4 is a block diagram depicting an example transformation of a digitized document according to various embodiments.

In sub-step 121, computing device 32 (e.g., through execution of location module 42) performs image analysis (e.g., using image processing and/or computer-vision analysis) of a geometry of pixels of the digital image 50 to locate instances of geometric shapes 54 associated with one or more field prototypes 52. Operation of sub-step 121 may be illustrated with reference to FIGS. 3 and 4. FIG. 3 depicts an example arrangement 300 of digital image 50 as it is transformed according to an example embodiment of method 100, and FIG. 4 depicts another example arrangement 400 of digital image 50 as it is transformed according to an example embodiment of method 100.

In some embodiments, computing device 32 (e.g., through execution of location module 42) locates checkboxes 306, 308, 406-1, 408(a) having a square shape with a side length within a given size range. For example, a checkbox may be defined by a field prototype 52 that includes a geometric shape descriptor 54 with parameters 55 that define a square within a size range and with certain line quality characteristics (e.g., lines having a thickness within a defined range). For example, in one embodiment, the length of a side of the square of a checkbox is within a range of 1/8 inch up to 1/2 inch. As another example, in one embodiment, the width of the borders of the square is within a range of 0.5 points (a point being 1/72 inch) to 5 points. As another example, in another embodiment, the width of the borders of the square is within a range of 5% to 15% the length of a side of the square.

In some embodiments, computing device 32 (e.g., through execution of location module 42) locates text entry fields 408(c) having ruled lines parallel to a direction 402 of text flow. Thus, since text 404 within digital image 50 flows in direction 402, lines of text entry field 408(c) are parallel to that direction 402. A text entry field 48(c) may be defined by a field prototype 52 that includes a geometric shape descriptor 54 with parameters 55 that define a ruled text entry field having one or more parallel lines with a defined line width range (and other defined line quality characteristics) and a defined line length range.

It should be understood that additional field prototypes 52 may define additional field types, such as, for example, enclosed unruled text boxes 406-2, circular radio buttons (not depicted), etc.

Figure 6:
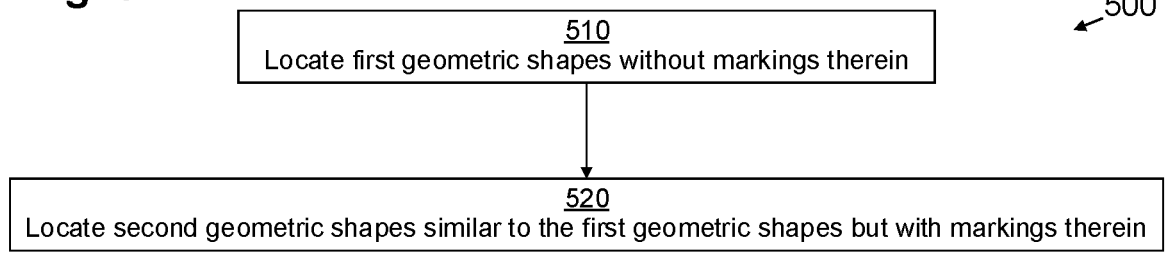
FIG. 6 is a flowchart depicting an example procedure according to various embodiments.
Figure 7:
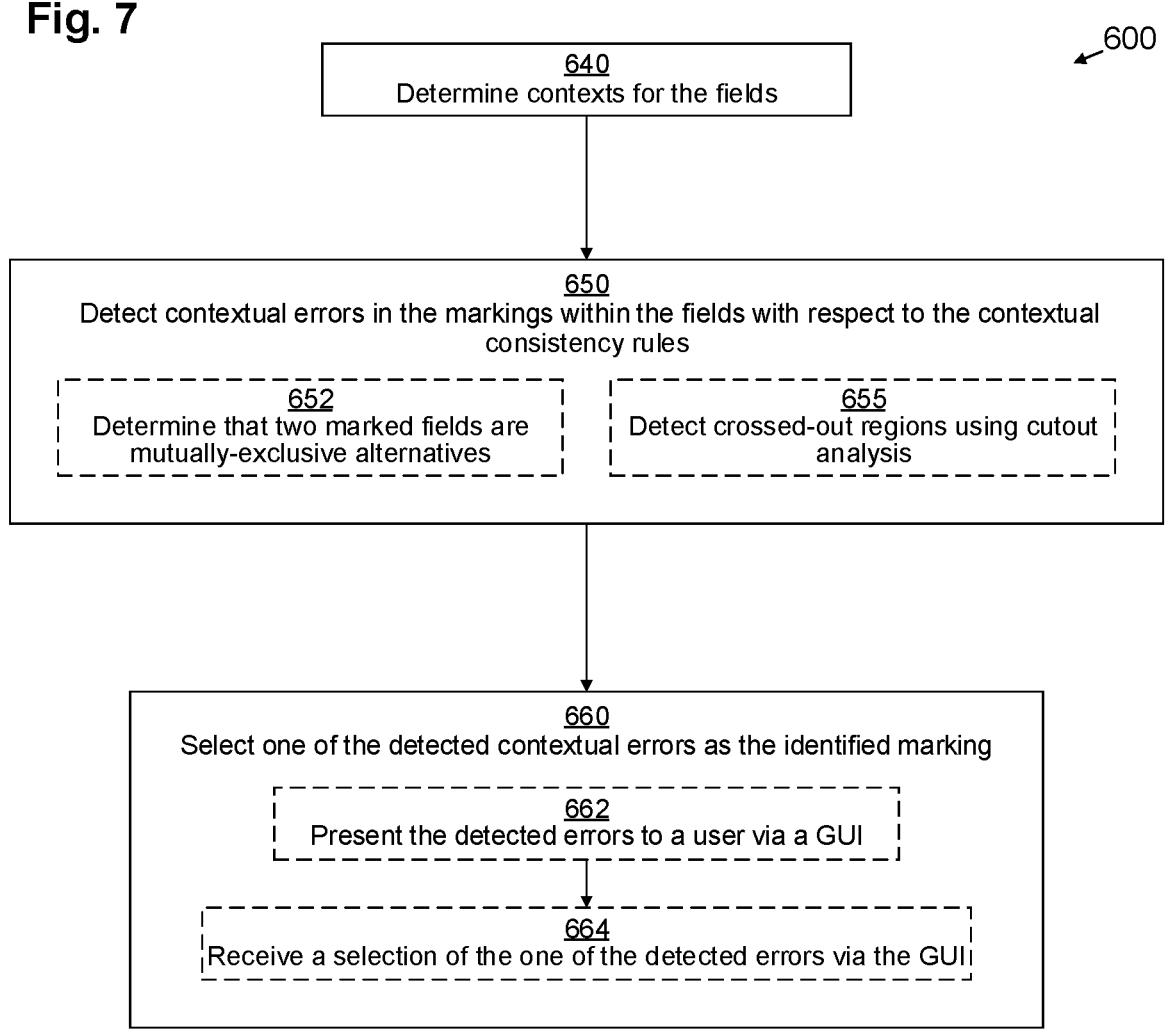
FIG. 7 is a flowchart depicting an example procedure according to various embodiments.

In some embodiments, performance of sub-step 121 may include performance of method 500 from FIG. 6. In step 510 of method 500, computing device 32 (e.g., through execution of location module 42) locates first geometric shapes that do not contain any markings 310, 410 therein, these first (unmarked) geometric shapes defining unmarked fields 306, 406. Then, in step 520, computing device 32 (e.g., through execution of location module 42) locates second geometric shapes similar to the first geometric shapes but with markings 310, 410 therein, these second (marked) geometric shapes defining marked fields 308, 408. In some embodiments, step 510 is performed with reference to the field prototypes 52, providing examples of what empty fields of various types look like on the paper form 48 when unfilled, and step 520 searches for filled fields similar to the empty fields of various types but containing markings 310, 410. In some embodiments, computing device 32 (e.g., through execution of location module 42) searches for markings 310, 410 by searching for patterns of pixels that match a set of criteria (not depicted) defining hand-drawn or non-computer-drawn marks. These criteria may be defined using machine learning, for example.

Returning to FIG. 2, in step 130, computing device 32 (e.g., through execution of identification module 44) identifies a marking 310, 410 within one of the marked fields 308, 408 as being contrary to a set of rules. In some embodiments, performance of step 130 may include performance of method 600 from FIG. 7.

In step 640, computing device 32 (e.g., through execution of identification module 44) determines contexts for the located fields 56. In some embodiments, step 640 may be performed as method 200 from FIG. 3.

In step 210, computing device 32 (e.g., through execution of identification module 44) locates descriptive text 59 that fits a text placement pattern 60 with respect to one or more of the located fields 56. Text placement patterns 60 define what text within the digital image 50 can be considered to be descriptive text 59 specific to particular located fields 56. In some embodiments, step 210 includes sub-steps 212 or 214.

In sub-step 212, computing device 32 (e.g., through execution of identification module 44) locates descriptive text 59 that is within a distance (e.g., a predefined distance) of one of the located fields 56 in one of a set of coordinates or layouts (e.g., a predefined set of orientations). In one embodiment, four orientations are defined: above, below, left, and right. The distance may be, for example, ½ inch or 1 inch. Thus, these orientations (taken together with a distance range) may define different text placement patterns 60 for use in connection with sub-step 212.

Figure 5:
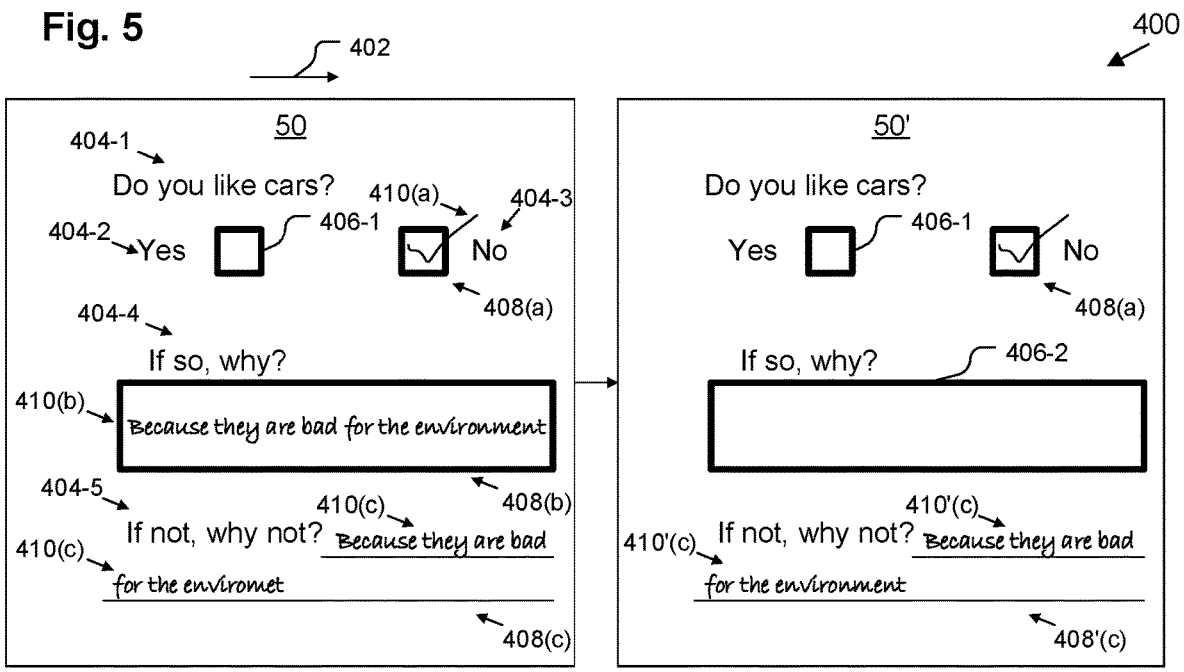
FIG. 5 is a block diagram depicting an example transformation of a digitized document according to various embodiments.

With reference to FIG. 4, in sub-step 212, computing device 32 (e.g., through execution of identification module 44) searches for and locates descriptive text 304-6 (above) in connection with fields 308(c), 308(d); descriptive text 304-7 (left) in connection with field 308(c); and descriptive text 304-8 (right) in connection with field 308(d). With reference to FIG. 5, in sub-step 212, computing device 32 (e.g., through execution of identification module 44) searches for and locates descriptive text 404-1 (above) in connection with fields 406-1, 408(a); descriptive text 404-2 (left) in connection with field 406-1; descriptive text 404-3 (right) in connection with field 408(a); descriptive text 404-4 (above) in connection with field 408(b); and descriptive text 404-5 (above) in connection with field 408(c).

In sub-step 214, computing device 32 (e.g., through execution of identification module 44) locates descriptive text 59 that is within a distance (e.g., a predefined distance) of one of the located fields 56 in one of a set of coordinates or layouts (e.g., a predefined set of orientations), with other(s) of the located fields 56 being arranged in a column or row arrangement. The same orientations may be used as in sub-step 212. The same distance may be used as in sub-step 212, but the distance is measured between the descriptive text 59 and the closest field 56 in the row or column, and the same distance may be used between fields 56 within a row or column. Thus, the orientations (taken together with a distance range) may define different text placement patterns 60 for use in connection with sub-step 214.

With reference to FIG. 4, in sub-step 214, computing device 32 (e.g., through execution of identification module 44) searches for and locates descriptive text 304-1 (above) in connection with fields 308(a), two empty fields 306, and 308(b); descriptive text 304-4 (left) in connection with field 308(a) and the empty field 306 next to it; descriptive text 304-5 (left) in connection with field 308(b) and the empty field 306 next to it; descriptive text 304-2 (above) in connection with field 308(a) and the empty field 306 below it; descriptive text 304-3 (above) in connection with field 308(b) and the empty field 306 above it; descriptive text 304-9 (above) in connection with fields 308(e), 308(f), 308(g) and one empty field 306; descriptive text 304-10 (left) in connection with field 308(e) and the empty field 306 next to it; descriptive text 304-11 (left) in connection with fields 308(f), 308(g); descriptive text 304-12 (below) in connection with fields 308(e), 308(f); and descriptive text 304-13 (below) in connection with field 308(g) and the empty field 306 above it.

In step 220, computing device 32 (e.g., through execution of identification module 44) deciphers or otherwise determines a meaning of the located descriptive text 59. For example, computing device 32 (e.g., through execution of identification module 44) may apply optical character recognition (OCR) as well as natural language processing to decipher meaning. In some embodiments, step 220 includes sub-steps 221, 223, and/or 225.

In sub-step 221, computing device 32 (e.g., through execution of identification module 44) may decipher or otherwise determine located descriptive text 59 associated with a first field 56 as having an affirmative meaning. For example, the word "Yes" in descriptive text 304-2, 304-7, 304-12, and 404-2 can be deciphered or otherwise determined as having an affirmative meaning for fields 308(a), 308(c), 308(e), 308(f), 406-1 as well as for one empty field 306.

In sub-step 223, computing device 32 (e.g., through execution of identification module 44) may decipher or otherwise determine located descriptive text 59 associated with a second field 56 as having a negative meaning. For example, the word "No" in descriptive text 304-3, 304-8, 304-13, and 404-3 can be deciphered or otherwise determined as having a negative meaning for fields 308(b), 308(d), 308(g), 408(a), as well as for two empty fields 306.

In sub-step 225, computing device 32 (e.g., through execution of identification module 44) may decipher or otherwise determine located descriptive text 59 associated with a third field 56 as having a conditional meaning (i.e., a meaning that depends on another answer). For example, the word "If" in descriptive text 404-4, 404-5 can be deciphered as having a conditional meaning for fields 408(b), 408(c).

In step 230, computing device 32 (e.g., through execution of identification module 44) infers or otherwise identifies a context for the one or more located fields 56 based on applying a set of rules (e.g., contextual meaning rules 62) to the deciphered text. In some embodiments, step 230 includes sub-steps 234, 236.

In step 234, computing device 32 (e.g., through execution of identification module 44) determines that the first field (see sub-step 221) and the second field (see sub-step 223) are mutually-exclusive alternatives because one is affirmative and the other negative. Thus, for example, field 308(a) and the empty field 306 to its right are mutually-exclusive alternatives. Similarly, field 308(b) and the empty field 306 to its left are mutually-exclusive; fields 308(c), 308(d) are mutually-exclusive; field 308(e) and the empty field 306 to its right are mutually-exclusive; fields 308(f), 308(g) are mutually-exclusive; and field 408(a) and the empty field 406-1 to its right are mutually-exclusive.

In step 236, computing device 32 (e.g., through execution of identification module 44) determines that the third field (see sub-step 225) and either the first field (see sub-step 221) or the second field (see sub-step 223) are mutually-exclusive alternatives because the third field is conditional on one of the first and second fields being marked. Thus, for example, field 410(b) is mutually exclusive with field 408(a) because field 408(a) is negative, but field 410(b) is conditional on an affirmative value. Similarly, field 410(c) is mutually exclusive with field 406-1 because field 406-1 is affirmative, but field 410(c) is conditional on a negative value.

Returning to FIG. 7, in step 650, computing device 32 (e.g., through execution of identification module 44) detects contextual errors in the markings 58 within the located fields 56 with respect to the contextual consistency rules 64. In some embodiments, step 650 includes sub-steps 652, and/or 655.

In sub-step 652, computing device 32 (e.g., through execution of identification module 44) applies one contextual consistency rule 64 to determine that two marked fields 54 are mutually-exclusive alternatives. For example, in the context of FIG. 4, computing device 32 (e.g., through execution of identification module 44) determines that marked fields 308(c), 308(d) are mutually-exclusive alternatives, and, since they both contain markings 310(c), 310(d), there is an error. As another example, in the context of FIG. 5, computing device 32 (e.g., through execution of identification module 44) determines that marked fields 408(a), 408(b) are mutually-exclusive alternatives, and, since they both contain markings 410(a), 410(b), there is an error.

In sub-step 655, computing device 32 (e.g., through execution of identification module 44) applies another contextual consistency rule 64 to determine that a marking 58 represents an error by detecting a crossed-out region using cutout analysis (e.g., using machine-learning, pattern analysis, convolutional neural networks, etc.). For example, in the context of FIG. 4, computing device 32 (e.g., through execution of identification module 44) determines that marking 310(e) is a crossout by analyzing marking 310(e) and sensing that it has a similar pattern to other crossed-out markings on which it has been trained. Similarly, identification module 44 determines that marking 310(g) is a crossout.

In step 660, computing device 32 (e.g., through execution of identification module 44) selects one of the detected contextual errors as the identified marking 68. In one embodiment, step 660 includes sub-steps 662 and 664. In sub-step 662, identification module 44 presents several of the detected errors to user 39 via GUI on display 38. For example, in the context of FIG. 4, computing device 32 (e.g., through execution of identification module 44) may present markings 310(e), 310(g) as errors and the pair of markings 308(c), 308(d) as representing an error Similarly, in the context of FIG. 5, computing device 32 (e.g., through execution of identification module 44) may present the pair of markings 408(a), 408(b) as representing an error. Then, in sub-step 664, computing device 32 (e.g., through execution of identification module 44) receives a selection of one of the detected errors from the user 39 via the GUI. For example, in the context of FIG. 4, computing device 32 (e.g., through execution of identification module 44) may receive a selection of marking 310(e) as the identified marking 68. As another example, in the context of FIG. 5, computing device 32 (e.g., through execution of identification module 44) may receive a selection of marking 410(b) as the identified marking 68. In some embodiments, the user 39 may select an error that was not detected in step 650 or presented in sub-step 662. Thus, for example, in the context of FIG. 4, no error was detected in the row marked "Chocolate" next to descriptive text 304-4, but the user 39 may select marking 310(a) as an error because it happened that the user 39 checked field 308(a) accidentally. In some embodiments, user 39 may select several errors.

Returning to FIG. 2, in step 170, computing device 32 (e.g., through execution of modification module 46) modifies the digital image 50 to remove the identified marking 68, so that the portion of the digital image 50 depicts the one field 66 of the paper form 48 as being unmarked. For example, with reference to FIG. 4, modified digital image 50' is depicted after four modifications have occurred. Thus, marking 310(a) has been removed from the "Yes" checkbox field 308(a), marking 310(d) has been removed from the "No" checkbox field 308(d), marking 310(e) has been removed from the "Yes" checkbox field 308(e), and marking 310(g) has been removed from the "No" checkbox field 308(g). As another example, with reference to FIG. 5, marking 410(b) has been removed from the "If so, why?" unlined text entry field box 408(b).

In some embodiments, step 170 may include sub-step 171. In sub-step 171, computing device 32 (e.g., through execution of modification module 46) replaces one of the second geometric shapes (with a marking 58 therein, see sub-step 128) with a corresponding one of the first geometric shapes (without a marking 58 therein, see sub-step 127) located elsewhere in the digital image 50. Thus, for example, with reference to FIG. 4, computing device 32 (e.g., through execution of modification module 46) removes all of field 308(a) including the marking 310(a) from the digital image 50 and replaces it with a copy of an empty field 306 of the same type from elsewhere in the digital image 50, such as the empty field 306 located immediately to the right of field 308(a). Doing this allows a background color of the paper form 48 to be cleanly seen behind the "Chocolate"—"Yes" checkbox in revised digital image 50'. It should be understood that the boundaries of the fields 56 may be wider than the located geometric shape. For example, marking 310(a) clearly extends beyond the checkbox of field 308(a) itself, but the entire marking 310(a) is removed in revised digital image 50'. This is because the boundary of the field 308(a) and of the empty model field 306 extends a distance past the square of the checkbox.

In some cases, it may be impossible or impractical to perform sub-step 171 (e.g., if no unmarked fields of the same type as the identified field 66 were found in the digital image 50 in sub-step 127 or if the background varies significantly across the paper form 48). In such cases, sub-step 173 may be performed instead of sub-step 171. In addition, in some embodiments, sub-step 173 may replace sub-step 171 under all circumstances. In sub-step 173, computing device 32 (e.g., through execution of modification module 46) erases pixels of the identified marking 68 and fills in the erased pixels with a background color of the digital image 50 except where the identified field 66 has a different color. This may involve performing hand-drawing analysis to precisely define the shape of the identified marking 68 using the criteria defining hand-drawn or non-computer-drawn marks so that those pixels can be masked out. The masked-out pixels can then be smoothly interpolated using the surrounding pixels.

In some embodiments, step 170 may include sub-step 176. In sub-step 176, computing device 32 (e.g., through execution of modification module 46) may remove all markings 58 from the digital image 50 so that the revised digital image 50' depicts none of the original markings 58. This may include just markings 58 from within located fields 56 or it may even include additional markings that are entirely outside any located fields 56. Exactly which markings are included may be based on user feedback (see, e.g., sub-step 664 from FIG. 7).

In some embodiments, sub-step 176 may include sub-step 177. In sub-step 177, the removed markings may be saved, and after they are removed, similar markings of a different color may replace the removed markings. For example, if the markings were done in black ink but they were required to be done in blue ink, computing device 32 (e.g., through execution of modification module 46) may replace the original black markings with blue versions.

It should be understood that a modified marking 69 may replace the identified marking 68 even in situations in which sub-step 176 is not performed. Thus, for example, the color of even a single identified marking 68 can be changed. As another example, a marking 68 that contains an error can be modified to remove the error. For example, with reference to FIG. 5, marking 410(*c*) contains spelling errors (i.e., the word "environment" is misspelled "enviromet" with two n's missing). Thus, in the revised digital image 50' the spelling error has been corrected with revised marking 410'(*c*) having the correct spelling. This may be done by copying the missing letters from elsewhere in the digital image 50 (e.g., copying the letter "n" from earlier in the word "enviromet") using the same handwriting. Such spelling correction can also be applied to the descriptive text 404 as well.

In some embodiments, after step 170, computing device 32 may print the revised digital image 50' onto paper (e.g., using a printer) to generate a revised or corrected version of the original physical document 48. In embodiments in which sub-step 176 is performed without sub-step 177, the user 39 may direct the computing device 32 to print the revised digital image 50' depicting none of the original markings 58 to allow the user 39 (or another person) to fill out one or more copies of the paper form 48 again with potentially completely different selections.

Thus, techniques for allowing a user 39 to make corrections on a digitized document 50 with handwritten content (such as by correcting a filled-out form 48 without requiring another copy of the form 48). This result may be accomplished by having a computing device 32 detect marked fields 56, 308, 408 on a digital form 50 and using a computing device 32 to remove mistaken marks 68, 308(*a*), 308(*d*), 308(*e*), 308(*g*), 408(*b*) from fields 66, 310(*a*), 310(*d*), 310(*e*), 310(*g*), 410(*b*) of the digital form 50'.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

The word "each," when used in conjunction with members of a "set," means that each and every member of the set has a particular feature, but there may be additional similar items that are not members of the set and do not have the particular feature. Thus, for example, the statement that "each of a set of devices is blue" means that for a particular set of devices, each of those devices is blue, but it does not mean to exclude the possibility that there are additional devices not in the set that are not blue.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method comprising:
locating, by a computing device, a portion of a digital image that depicts fields of a paper form, the fields including markings;
identifying, by the computing device, a marking within one field of the fields of the paper form as being contrary to a set of rules;
performing, by the computing device, computer-vision analysis of a geometry of pixels of the digital image to locate one or more geometric shapes associated with one or more field prototypes;
locating, based on the computer-vision analysis, a first geometric shape in the one field, wherein the first geometric shape is associated with the marking within the one field;
locating, based on the computer-vision analysis. a second geometric shape without any marking, wherein the second geometric shape is similar to the first geometric shape;
modifying, by the computing device, the digital image to remove the identified marking from the digital image by replacing the first geometric shape with the second geometric shape; and
causing to display, by the computing device and on a user device, of the portion of the digital image depicting the one field of the paper form as being unmarked.

2. The method of claim 1, wherein:
the set of rules comprises contextual consistency rules; and
identifying the marking within the one field as being contrary to a set of rules comprises:
determining contexts for the fields;
detecting contextual errors in the markings within the fields with respect to the contextual consistency rules; and
selecting one of the detected contextual errors as the identified marking.

3. The method of claim 2, wherein determining the contexts for the fields comprises:
locating descriptive text that fits a placement pattern with respect to one or more of the fields;
determining meaning of the located descriptive text; and
identifying a context for the one or more fields based on applying a set of contextual meaning rules to the determined text.

4. The method of claim 3, wherein locating the descriptive text that fits the placement pattern with respect to the one or more located fields comprises locating descriptive text that is within a predefined distance of the one or more located fields in one of a predefined set of orientations.

5. The method of claim 3, wherein:
the located descriptive text comprises first text located in proximity to a first field of the one or more of the fields and second text located in proximity to a second field of the one or more of the fields;
determining the meaning of the located descriptive text comprises identifying the first text as being affirmative and the second text as being negative;
identifying the context for the one or more fields based on applying the set of contextual meaning rules to the determined text comprises determining that the first field and the second field are mutually-exclusive alternatives; and
detecting contextual errors in the markings within the fields with respect to the contextual consistency rules comprises determining that both the first field and the second field including markings is a contextual error.

6. The method of claim 2, wherein detecting the contextual errors in the markings within the fields comprises detecting crossed-out regions using cutout analysis.

7. The method of claim 2, wherein selecting the one of the detected contextual errors as the identified marking comprises:
presenting the detected contextual errors to a user via a graphical user interface (GUI); and
receiving a selection of the one of the detected contextual errors via the GUI.

8. The method of claim 7, wherein identifying the marking further comprises updating the contextual consistency rules using machine learning based on the selection received from the user via the GUI.

9. The method of claim 1, wherein modifying the digital image to remove the identified marking from the digital image comprises replacing the second geometric shape with a corresponding first geometric shape located elsewhere in the digital image.

10. The method of claim 1, wherein locating the geometric shapes associated with one or more field prototypes comprises locating checkboxes having a square shape with a side length within a given size range.

11. The method of claim 1, wherein locating the geometric shapes associated with one or more field prototypes comprises locating text entry fields having ruled lines parallel to a direction of text flow.

12. The method of claim 1, wherein the method further comprises capturing the digital image from the paper form using image acquisition hardware.

13. The method of claim 1, wherein modifying the digital image further comprises removing all identified markings from the digital image, so that the portion of the digital image depicts all the fields of the paper form as being unmarked.

14. The method of claim 13, wherein modifying the digital image further comprises replacing the removed markings with markings of a different color than the removed markings.

15. The method of claim 1, wherein modifying the digital image to remove the identified marking from the digital image comprises erasing pixels of the identified marking and filling in the erased pixels with a background color of the digital image except where the one field of the paper form has a different color.

16. A computer program product comprising a non-transitory computer-readable storage medium storing instructions, which, when performed by a computing device, cause the computing device to:
locate a portion of a digital image that depicts fields of a paper form, the fields including markings;
identify a marking within one field of the fields of the paper form as being contrary to a set of rules;
perform computer-vision analysis of a geometry of pixels of the digital image to locate one or more geometric shapes associated with one or more field prototypes;
locate, based on the computer-vision analysis. a first geometric shape in the one field, wherein the first geometric shape is associated with the marking within the one field;
locating, based on the computer-vision analysis, a second geometric shape without any marking. wherein the second geometric shape is similar to the first geometric shape;

modify the digital image to remove the identified marking from the digital image by replacing the first geometric shape with the second geometric shape; and cause to display, on a user device, of the portion of the digital image depicting the one field of the paper form as being unmarked.

17. The computer program product of claim 16, wherein the instructions, when performed by the computing device, further cause the computing device to locate the geometric shapes associated with the one or more field prototypes by locating checkboxes having a square shape with a side length within a given size range.

18. The computer program product of claim 16, wherein the instructions, when performed by the computing device, further cause the computing device to locate the geometric shapes associated with the one or more field prototypes by locating text entry fields having ruled lines parallel to a direction of text flow.

19. An apparatus comprising processing circuitry coupled to memory configured to:

locate a portion of a digital image that depicts fields of a paper form, the fields including markings;

identify a marking within one field of the fields of the paper form as being contrary to a set of rules;

perform computer-vision analysis of a geometry of pixels of the digital image to locate one or more geometric shapes associated with one or more field prototypes;

locate, based on the computer-vision analysis, a first geometric shape in the one field, wherein the first geometric shape is associated with the marking within the one field;

locate, based on the computer-vision analysis, a second geometric shape without any marking, wherein the second geometric shape is similar to the first geometric shape;

modify the digital image to remove the identified marking from the digital image by replacing the first geometric shape with the second geometric shape; and cause to display, on a user device, of the portion of the digital image depicting the one field of the paper form as being unmarked.

20. The apparatus of claim 19, wherein the apparatus further comprises image acquisition hardware configured to capture the digital image from the paper form.

* * * * *